United States Patent [19]
Brechtel et al.

[11] Patent Number: 5,748,962
[45] Date of Patent: May 5, 1998

[54] COMMON CHANNELS FOR INTER-APPLICATION COMMUNICATIONS

[75] Inventors: James P. Brechtel; Greg La Buhn, both of Colorado Springs, Colo.

[73] Assignee: MCI Communications Corporation, Washington, D.C.

[21] Appl. No.: 720,479

[22] Filed: Sep. 30, 1996

[51] Int. Cl.[6] .................................................. G06F 15/173
[52] U.S. Cl. .......................... 395/701; 395/651; 395/683; 395/684
[58] Field of Search .................................. 395/682, 683, 395/680, 200.15, 701, 651, 684

[56] References Cited

U.S. PATENT DOCUMENTS

| | | | |
|---|---|---|---|
| 5,430,836 | 7/1995 | Wolf et al. | 395/155 |
| 5,499,343 | 3/1996 | Pettus | 395/200.2 |
| 5,509,123 | 4/1996 | Dobbins et al. | 395/200.15 |
| 5,557,798 | 9/1996 | Skeen et al. | 395/650 |

OTHER PUBLICATIONS

B. Stroustrup, The C++ Programming Language, Second Eddition, Addison–Wesley Publishing Company, pp. 191–193, 1991.

*Primary Examiner*—Lucien U. Toplu
*Assistant Examiner*—Sue X. Lao

[57] ABSTRACT

The present invention is a set of common utilities, implemented as object classes, that provide common channels of communications among applications that run on a distributed platform. An application developer can program communications interfaces to other applications by creating a single application interface using these utilities. Creating this single interface simply involves abstracting an object class from a base class, and defining a few key methods. The invention allows an application developer to focus efforts on the application itself and rapidly prototype the application, by removing the need to develop communication interfaces with other applications. All requirements for inter-application communications are contained within the common utilities.

2 Claims, 4 Drawing Sheets

COMMON CHANNELS FOR INTER-APPLICATION COMMUNICATIONS

RELATED APPLICATIONS

The present application relates to co-pending application Ser. No. 08/426,256, filed Apr. 21, 1996, entitled "Network Information Concentrator".

BACKGROUND OF THE INVENTION

Modern computer architectures are implemented on distributed client/server platforms. To accomplish this, applications that run on different processors (client processor, server processor), as well as applications that run on the same processor, must communicate with each other. This involves using standard communications protocols, such as TCP/IP and SNA. Shared memory may be used for communications among applications running on the same processor or among multiple processors sharing the same physical memory.

It is important for application development to focus on the application, and to not get tied up in development for various inter-application communication protocols. Therefore, there is a need for a set of common utilities that can perform inter-application communications functions that will be transparent to the applications.

BRIEF DESCRIPTION OF THE PRESENT INVENTION

The present invention is a set of common utilities, implemented as object classes, that provide common channels of communications among applications that run on a distributed platform. An application developer can program communications interfaces to other applications by creating a single application interface using these utilities. Creating this single interface simply involves abstracting an object class from a base class, and defining a few key methods.

The invention allows an application developer to focus efforts on the application itself and rapidly prototype the application, by removing the need to develop communication interfaces with other applications. All requirements for inter-application communications are contained within the common utilities.

The present invention can be used for inter-application communications in an operative system. A main objective is to provide a method for inter-application and inter-process communications, with the advantage that application developers can simply use the present invention for their application's communications, without having to develop it specific to an application. The present invention provides a set of utilities that an application developer can incorporate into an application to provide the inter-process communications needed. When the application is placed into production (in an operative system), the present invention then becomes the method for inter-process communications.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1A:
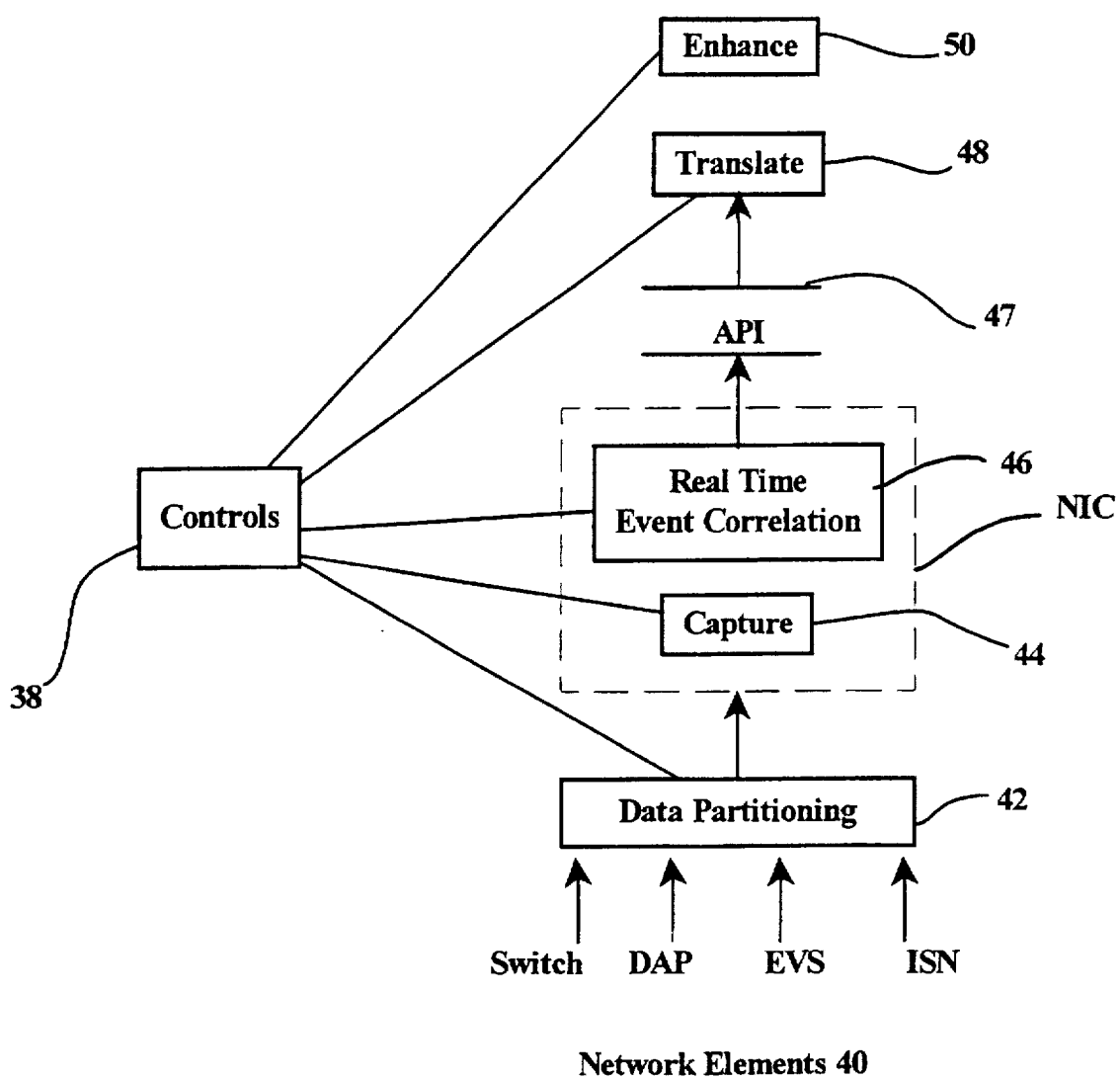
FIG. 1A is a functional block diagram of Assignee's co-pending application Ser. No. (08/426,256) relating to telecommunications network architecture that incorporates a network information concentrator (NIC).

In assignee's co-pending patent application (Ser. No. 08/426,256) a network information concentrator (NIC) is disclosed for a telecommunications network. The NIC is an example of how the invention may be used. Any computer system or platform that requires inter-process communications may use the present invention. A functional block diagram of the basic network information architecture incorporating the NIC, as is disclosed in the co-pending application is shown in FIG. 1A herein. The lower portion of the Fig. shows data from various types of network elements generally indicated by reference numeral 40. They may include a network switch, such as switch 10, a data access point (DAP) 32, an enhanced voice systems (EVS) platform, or an intelligent services network (ISN) platform. The data partitioning function 42 involves the collecting of data elements from network elements on a call-by-call basis. A particular call is tagged by the network via a customary network call ID tag, which is carried along to each involved network element for the call. Accordingly, the data partitioning function occurs on the call level, and collected data elements undergo hard point data storage. Function 42 is carried out by an adjunct processor connected to the network.

A succeeding data capture step occurs at 44. The function is actually carried out within the NIC. Although the NIC is shown as a single functional unit, it is, in fact, a distributed processor, such as a cluster of IBM RS 6000 units—Model R24. The real time event correlation function 46 ensures that data being partitioned is neither lost nor duplicated. Reference numeral 47 represents an application program interface (API) for users which enable them to acquire raw network data from the various network elements in the network. End customers may require such raw network data.

Functional steps 48 and 50 represent additional services which may be offered to a customer who has acquired raw data. Namely, translation of the data to different formats is indicated by function 48, while an enhanced data function 50 is indicated. Enhancement may be the combining of various types of data to obtain new results, as desired by the customer. Such enhanced data would, of course, require communication to customers by means of a further application is program interface (API). The indicated controls function 38 controls data sequencing, gap-duplication deletion, and re-transmission of lost data.

Figure 1B:
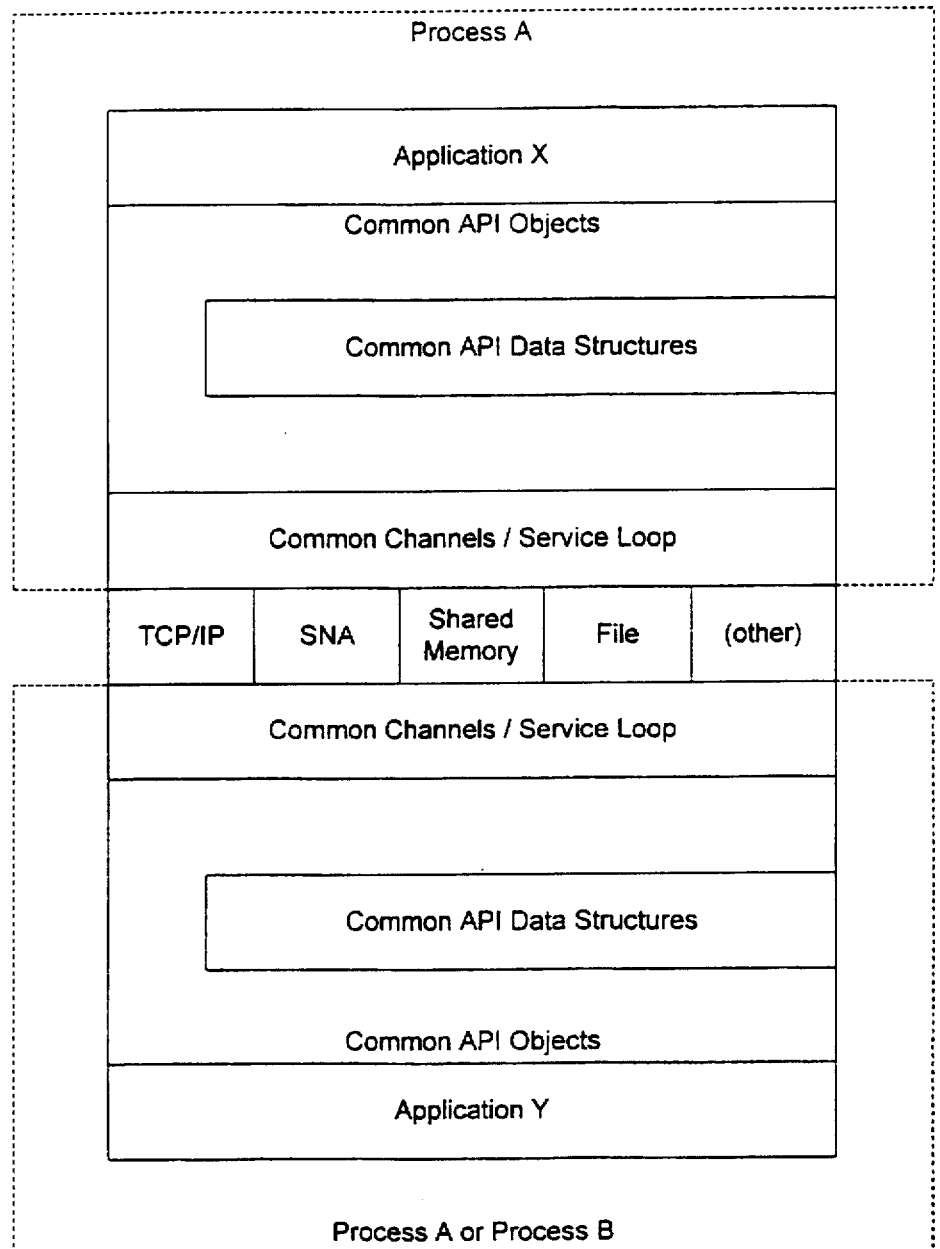
FIG. 1B is a block diagram illustrating the logical layer of inter-application communications employing the present invention.

FIG. 1B is a block diagram illustrating the logical layer of inter-application communications using the present invention. Process A represents a client or server process that is running on a particular computer. Within Process A there is an Application X running. Application X needs to communicate with (i.e., send a message to) Application Y. Application Y may be running on the same process, Process A, or it may be running on another client or server process, Process B. Process A and Process B may be running on the same or on different computers. The invention allows communication among various applications to be performed independent of whether the applications are running on the same computer or on different computers in a distributed architecture.

In general, applications communicate using Application Programming Interfaces (API). APIs are application-specific message formats. These API messages must then use a communications protocol (TCP/IP, SNA, shared memory, etc.) to be sent from one application to another. The present invention provides a common API, in the form of an abstract class with general methods, from which specific APIs may be derived and defined. The communication protocols available to these APIs are completely transparent to the application.

Using the present invention to communicate with Application Y, Application X uses common API objects that are instances of the derived API classes. By deriving specific API classes through inheritance from an abstract class, the data structures for these APIs are "wrapped" by the common API class hierarchy. This allows the code for Application X and Application Y to be independent of the API data structure.

The data that Application X needs to send to Application Y is thus contained in a common API object. This API object can then send itself to Application Y by creating a Common Channel object. The Common Channel Object uses an appropriate communications protocol—TCP/IP, SNA, Shared Memory—to transmit the data. It encapsulates all the information required to use the communications protocol, thus keeping the application—Application X, Application Y—from having to know it.

Using an object-oriented approach, the functionality that belongs with each API is encapsulated within the respective objects. Each API is derived from a common. API class and inherits behavior pertaining to the common header information. API objects are created from these derived classes, and can instruct themselves to be sent over a particular communications channel. The applications and communications interfaces need not be concerned with the structures of the API objects.

A Service Loop is used to process the input and output data from the Common Channels. It serves the function of a process manager. It is implemented as an object class, and calls on methods of other classes to perform application-specific functions. Even though these functions are application specific, they are defined with a common class methodology, and are therefore developed quickly and easily.

At the receive end, the Service Loop extracts the data from the Common Channel in the form of a common API object. This object is then read by Application Y using the methods that were defined for Application Y.

Figure 2:
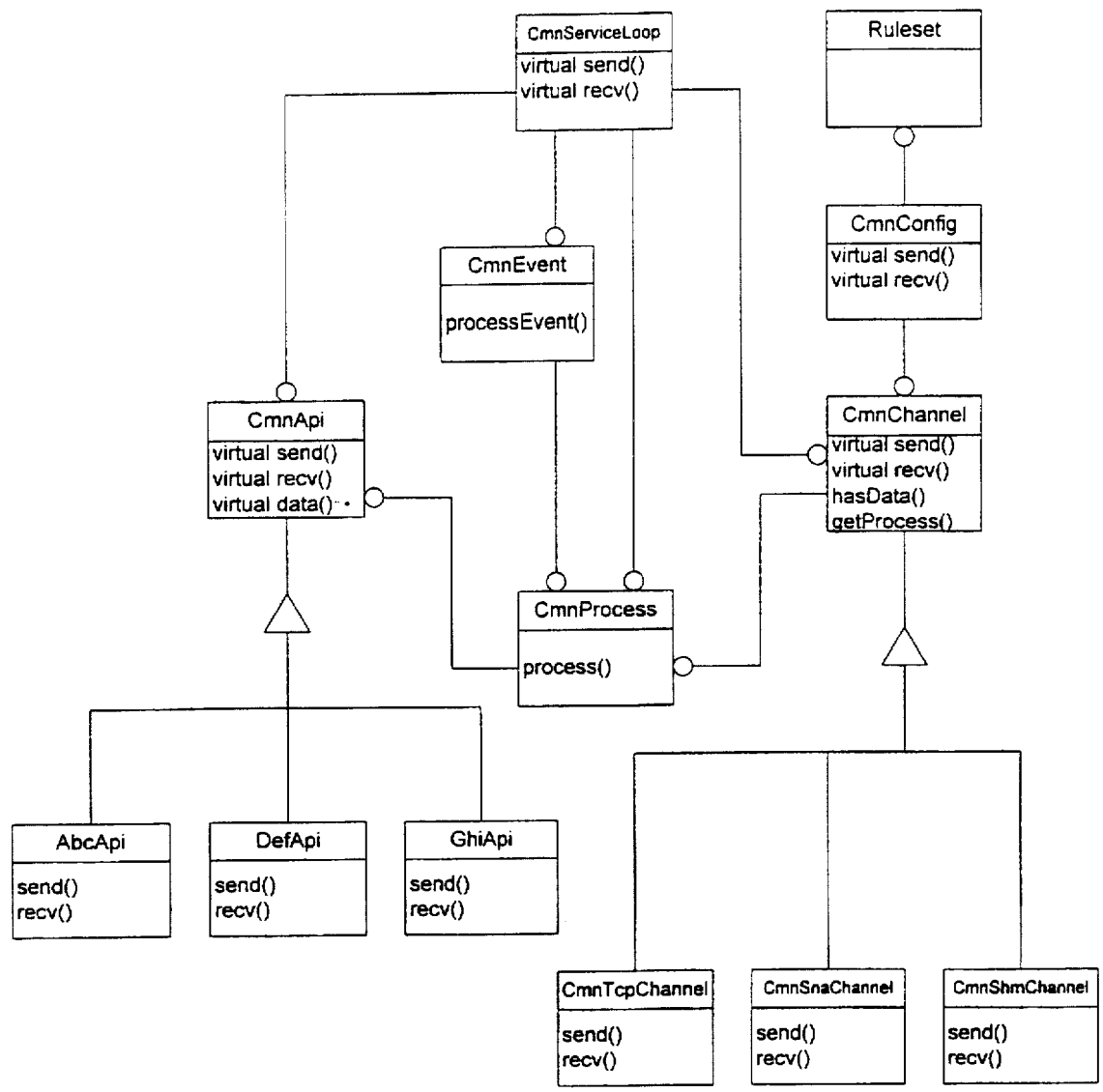
FIG. 2 is a class diagram showing the classes used to implement the present invention and their associations.

FIG. 2 is an OMT (Object Modeling Technique) class diagram, showing the classes used to implement the invention, and their associations. The CmnApi, CmnChannel, CmnEvent, and CmnProcess classes are abstract classes from which application-specific classes are derived (through inheritance). Objects instantiate from the derived classes. "Instantiate" is defined in the industry as the process of creating an object from a class. A class is a definition of structure of potential objects; it defines a category of attributes and methods. An object is the actual instance, or manifestation, of a class. When an object-oriented program is developed, only classes are defined in the source code. When an object-oriented program is executed, a class is referred to with specific values; at that time, an object, representing an instance of the class, is created. This process is referred to as an object "instantiating" from a class. For example, "humans" may be defined as a class, with attributes name, age, gender. During execution, this class is referred to with the values name=John Doe, age=30, gender=male. John Doe represents an object that instantiated from the class "humans".

There is a common process class (CmnProcess) that represents the application code for a particular application. For a particular application (i.e., Application X) a class is derived from the CmnProcess class, and its methods are further defined to incorporate code specific to Application X that relates to how particular API messages will be processed, and whether responses will be sent. The key method for this class is processApi, which will process the API messages that are sent to and received by the Application.

The common API class (CmnApi) is used to create polymorphic API objects that respond to a common verb set. These API objects contain the data that is being sent from Application X to Application Y. However, the application does not need to know of the internal data structure of the CmnApi objects.

The CmnApi class is an abstract class. For specific application interfaces (i.e., Application X/Application Y), subclasses are derived. Shown in FIG. 2 are three subclasses for illustrative purpose: AbcApi, DefApi, and GhiApi. Many more may be derived through inheritance. The CmnApi class contains generalized methods virtual send, virtual receive, and virtual data. These methods define the general API functions needed to send and receive data. When a subclass is derived from CmnApi, these methods are defined for the specific applications.

At the sending end, the application instructs the API object to send itself using the virtual send function defined in the CmnApi class. At the receiving end, the API object rebuilds itself using the virtual receive function defined in the CmnApi class. These functions are defined as:

virtual int send (CmnChannel& channel);

virtual int recv (CmnChannel& channel);

CmnChannel refers to the Common Channel class (defined below). This class represents the actual communications channel to be used to send/receive the API object. Note that all that is required is a reference to a CmnChannel object. The API object will use this reference to send or receive itself.

A common service loop (CmnServiceLoop) class serves as a process manager. It operates as a continuous loop, performing various functions during its servicing loop. Its objects process the input and output from the common channels to extract the API object. It also is an abstract class and contains its own virtual send and receive methods. It references a common event (CmnEvent) class for application-specific processing particular API objects.

The common event (CmnEvent) class is a utility class that is used to instruct the CmnServiceLoop to perform certain events based on generalized methods. These methods are defined in the application-specific classes that are derived from the CmnProcess class, and they specify how and when the events are to be performed. For example, a method may specify an event to be performed periodically (i.e., every five minutes) or iteratively (i.e., once during each CmnService-Loop iteration). Examples of events provided by the CmnEvent utility class include interrupts and alarms.

The application-specific classes which are derived from the CmnProcess class specify how events are to be performed. Once example would be to create a report with certain data every five minutes, and then send the report to a printer. The CmnServiceLoop, during its execution, will determine which events to perform, and then call on the CmnEvent to process the event. The CmnEvent invokes the CmnProcess object to execute application-specific instructions pertaining to the event. The CmnEvent class will specify both the event and the CmnProcess class. The CmnServiceLoop will then call on the CmnEvent to process the event. The key method of the CmnEvent class is processEvent.

A common channel (CmnChannel) class represents the actual communications channels that are used for application interfaces. It is an abstract class that contains generalized key methods. Subclasses specific to a particular communications protocol are derived from CmnChannel class, inheriting these key methods. Their methods are then further defined for the particular communications protocol they support. Examples of subclasses shown are Common TCP Channel, Common SNA Channel, and Common Shared Memory Channel. Others may be derived to support additional communication protocols.

All data needed to use a TCP/IP communications channel, an SNA communications channel, a shared memory communications channel, or any other communications channel is encapsulated in a CmnChannel object. The application that is using this communications channel to send or receive data does not need to contain any of this data; it only needs to reference the name of the channel.

A key method of CmnChannel classes is hasData. CmnServiceLoop uses this as a reference for indication that a particular CmnChannel object has data to be received.

CmnChannel uses a common configuration (CmnConfig) class to setup the configuration of each channel. CmnConfig references RuleSet class, which contains rules files for configuring communications channels. RuleSet also specifies what type of channels to instantiate from the various CmnChannel subclasses. This reference is made by the channel name, and passed on to CmnConfig.

To build an application using the present invention, a developer sets up a Rules file to indicate what channels can be used and how they will be configured. They then derive application-specific subclasses from the CmnApi, CmnProcess, and CmnEvent base classes, and specialize the generalized methods to correspond with the application. The derivation of these subclasses will require considerably less time and effort than programming into the application all the information needed to utilize the various communications channels.

Figure 3:
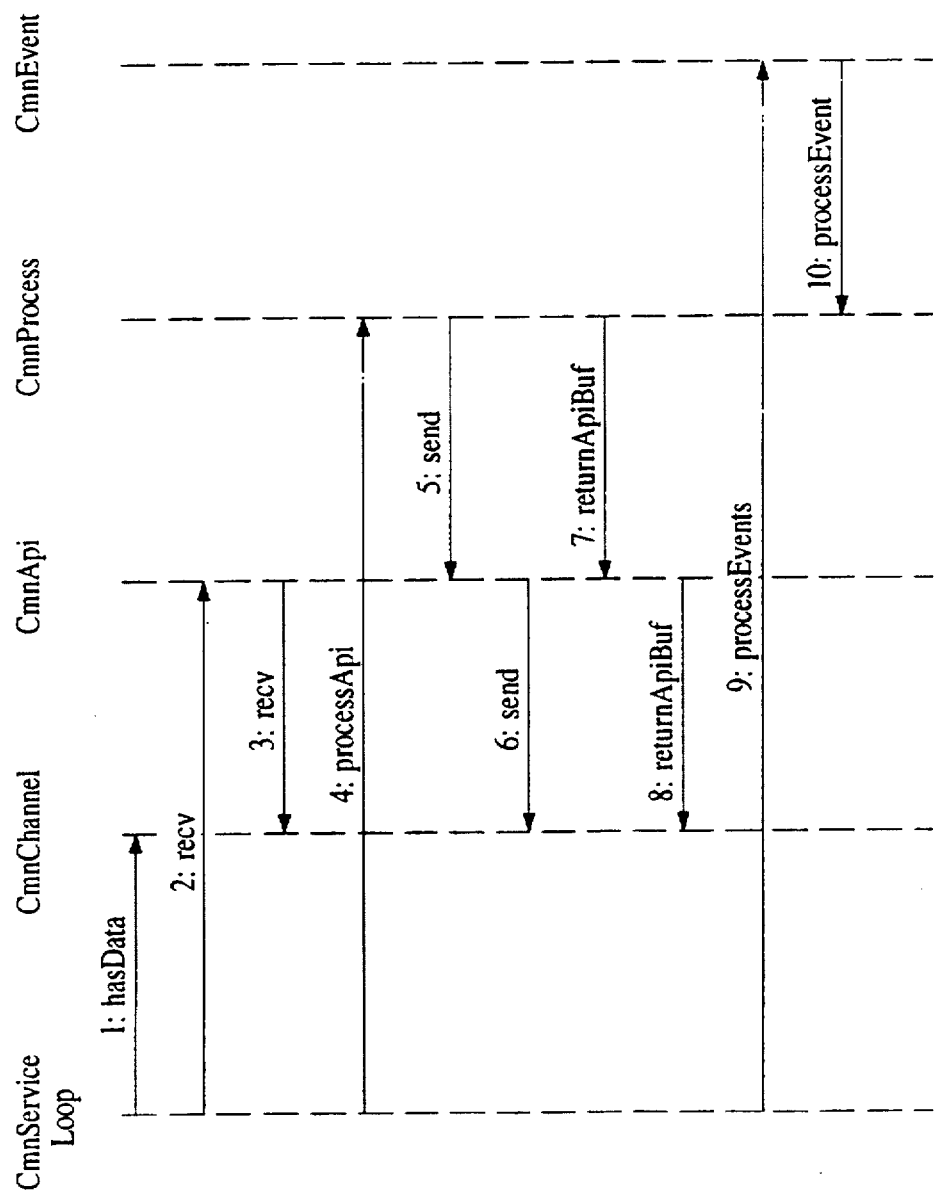
FIG. 3 is a class interaction diagram showing a typical sequence of events among the classes of the present invention when a server application receives a request from a client application.

FIG. 3 is a class interaction diagram, showing a typical sequence of events among the classes of the present invention when a server application receives a request from a client application, processes the request, and provides a response to the client. The request and response are in the form of a message, which is contained in an API object. This sequence is simply an example, and not indicative of the necessary sequence of the identified events.

The classes are identified by the base abstract class (i.e., CmnChannel), but it is understood that the interactions are among object instances of the derived subclasses (i.e., CmnTcpChannel).

1: CmnServiceLoop object calls the hasData method of CmnChannel object to determine that there is a message (data) to receive on the CmnChannel object.

2: CmnServiceLoop object calls the receive method of CmnApi object. CmnApi object will build itself to receive the message.

3: CmnApi object calls the receive method of the CmnChannel object to receive the message.

4: CmnServiceLoop object calls the processApi method of the CmnProcess object to process the API message in accordance with methods defined specifically for the application that is represented by the CmnProcess object.

5: CmnProcess object processes the message (server answers the client's request) and prepares a response message. The CmnProcess object calls the send method of CmnApi, and specifies which CmnChannel object to send the message. If a response to the original sender (client application) is needed, the same CmnChannel object used to receive the client's request is specified. Otherwise, a different CmnChannel object may be specified to send the message to another client. An API object is instantiated from a derived class of CmnApi (i.e., AbcApi) to obtain the message (response) that is being sent.

6: CmnApi object calls the send method of the CmnChannel object that was specified by CmnProcess to send the message over. In this way, the CmnApi object contains the instructions to send itself, and the Application does not need to know how to do this.

7: CmnProcess object calls the returnApiBuf method of CmnApi. This method returns the memory buffer used for the CmnApi object (clears the memory) so it can be used again for something else. This step also serves as acknowledgment that this particular processing of a message is complete.

8: CmnApi object calls the returnApiBuf method of CmnChannel to clear the memory used for the CmnChannel object.

8a: Repeat steps 1–8 for all channels within the common service loop.

9: CmnServiceLoop object calls the processEvents method of the CmnEvent object. This reference instructs the CmnServiceLoop object to perform a user-defined event, in accordance with the generalized methods of the CmnEvent base class. The processEvents method of the CmnEvent object will specify the event (by name), the trigger mechanism by which it is to be performed (i.e., every 5 minutes), and the CmnProcess class that is to perform it.

10: CmnEvent object calls the processEvent method of the CmnProcess object to perform the event. This method call will refer to the event by name.

In this example, steps 1–4 constitute a "receive" process, steps 5–6 constitute a "send" process, steps 7–8 constitute a "clear memory" process, and steps 9–10 constitute a "common events" process. FIG. 3 shows a typical sequence of events. Steps 9–10 occur once for each full iteration of the common service loop, steps 5–6 are optional and need not always be performed, steps 7–8 may follow directly behind steps 1–4, and other variances will occur.

It should be noted that the invention makes use of polymorphism, which is standard in object-oriented technology Polymorphism is the characteristic in which a commonly referred to method (i.e., "send") may perform differently in different objects. In this manner, the calling object does not need to know how the called object will perform the method; it simply calls the method and lets the called object perform it in whatever way it was defined. This is an example of encapsulation, a distinguishing feature of OOT (Object-Oriented Technology). Encapsulation refers to the manner in which both data (attributes) and procedures (methods) are defined within an object, invisible to external objects. This allows objects to be modified without affecting other parts of the program.

Thus, in FIG. 3, while step 2 indicates the CmnServiceLoop object calling the receive method of the CmnApi object, and step 3 indicates the CmnApi object calling the receive method of the CmnChannel object, these two receive methods will perform different functions within their respective objects.

It should be understood that the invention is not limited to the exact details of construction shown and described herein for obvious modifications will occur to persons skilled in the art.

We claim:

1. A method for using a set of common utilities implemented as object classes, to provide common channels of communications among applications that run on a distributed platform, comprising the steps:

invoking a common process class (CmnProcess) representing an application code for a particular application (Application X) wherein the code relates to how particular Application Programming Interfaces messages (API) will be processed, and whether responses will be sent;

calling an API processing function (processApi) from CmnProcess, for processing API messages that are sent to and received by the Application X;

invoking a common API class (CmnApi) to create polymorphic API objects that respond to a common verb set, the API objects containing the data that is being sent from Application X to another application;

CmnApi calling generalized virtual send, virtual receive, and virtual data functions for defining the general API functions needed to send and receive data;

at a data sending end, Application X instructing the API object to send itself using the virtual send function and at the receiving end the API object rebuilding itself using the virtual receive function;

CmnApi deriving subclasses with specific functions defined by Application X;

invoking a Common Channel class (CmnChannel) to reference a communications channel to be used to send/receive the API object, the API object using this reference to send or receive itself;

invoking a common service loop class (CmnServiceLoop) operating as a process manager performing a plurality of predefined functions during its servicing loop;

CmnServiceLoop objects processing the input and output from the common channels to extract the API object;

CmnServiceLoop containing its own virtual send and receive functions;

invoking a common event (CmnEvent) class for deriving application-specific classes and instructing the CmnServiceLoop to perform events based on generalized methods as to how and when the events are to be performed;

the derived application-specific classes also specifying which application-specific CmnProcess class to perform the event on;

the CmnServiceLoop, during its execution, determining which events are to be performed and invoking appropriate CmnEvent objects according to event type by calling on the CmnEvent "processEvent" method, the "processEvent" method invoking a CmnProcess "process" method to perform the event;

invoking CmnChannel for representing the actual communications channels that are used for application interfaces;

deriving subclasses specific to a particular communications protocol from CmnChannel;

calling upon functions of the derived subclasses relating to respective communications protocols they support;

encapsulating all data needed to use a protocol communications channel in a CmnChannel object, an application using this communications channel to send or receive data, the application itself not needing to contain any of this data and only needing to reference the name of the channel;

CmnChannel having a function (hasData) to which CmnServiceLoop responds as a reference for indicating that a particular CmnChannel object has data to be received;

a common configuration class (CmnConfig) invoked by CmnChannel to setup the configuration of each channel;

a rules set class (RuleSet) containing rules files for configuring communications channels being invoked by CmnConfig, RuleSet further specifying the types of channels to instantiate from CmnChannel subclasses, channel information made by channel name, and passed on to CmnConfig.

2. The method of claim 1 further comprising the following steps in response to a server application receiving a request from a client application and providing a response to the client, the request and response being in the form of a message contained in an API object:

a CmnServiceLoop object calling a status function (hasData) of a CmnChannel object to determine that there is an API message (data) to receive on the CmnChannel object;

the CmnServiceLoop object calling a receive function of an CmnApi object that builds itself to receive the message;

the CmnApi object calling a receive function of the CmnChannel object to receive the message;

the CmnServiceLoop object calling the processApi function of the CmnProcess object to process the API message in accordance with steps defined specifically for the application that is represented by the CmnProcess object;

the CmnProcess object processing the message resulting in the server answering the client's request and preparing a response message, this message processing occurring when the CmnProcess object calls the send function of a common API object which contains the message (response) to be sent;

the CmnApi object calling a send function of a common channel object to send the message, the CmnApi object containing the instructions to send itself thereby relieving the application from executing instructions for doing so;

the CmnProcess object calling a return buffer function (returnApiBuf) of CmnApi for clearing a memory buffer used for the CmnApi object and acknowledging that processing of a message is complete;

the CmnApi object calling the returnApiBuf function of CmnChannel to clear the memory used for the CmnChannel object;

the CmnServiceLoop object calling a process events function (processEvents) of the CmnEvent object, for instructing the CmnServiceLoop object to perform a user-defined event, in accordance with generalized functions of CmnEvent, including specifying the event, its frequency, and CmnProcess to perform it;

the CmnEvent object calling the process function of the CmnProcess object to perform the event, the event being referred to by a unique event type.

* * * * *